United States Patent [19]

Saxe

[11] Patent Number: 4,704,680
[45] Date of Patent: Nov. 3, 1987

[54] ADDRESS COMPUTATION SYSTEM FOR UPDATING STARTING ADDRESSES OF DATA ARRAYS IN AN ARRAY PROCESSOR WITHIN AN INSTRUCTION CYCLE

[75] Inventor: Charles L. Saxe, Beaverton, Oreg.

[73] Assignee: Tektronix, Inc., Beaverton, Oreg.

[21] Appl. No.: 641,098

[22] Filed: Aug. 15, 1984

[51] Int. Cl.[4] .............................................. G06F 9/00
[52] U.S. Cl. ................................................. 364/200
[58] Field of Search .............................. 364/200, 900

[56] References Cited

U.S. PATENT DOCUMENTS

| 4,314,333 | 2/1982 | Shibayama et al. | 364/200 |
| 4,365,292 | 12/1982 | Barnes et al. | 364/200 |
| 4,439,827 | 3/1984 | Wilkes | 364/200 |

OTHER PUBLICATIONS

RCA Product Specification Sheet for ATMAC Microprocessor "Microcomputer With 32-Bit Arithmetic Does High-Precision Number Crunching", *Electronics*, Feb. 24, 1982, pp. 105–110, Written by: K. McDonough, E. Caudel, S. Magar, and A. Leigh.
"A Microcomputer with Digital Signal Processing Capability", IEEE International Solid-State Circuits Conference, Feb. 10, 1982, By: S. Magar, Edward R. Caudel and Anthony Leigh, p. 32.
"16-Bit Bipolar Microprocess or Has On-Chip Multiply and Divide", By: Gary Burke, Shai Mor, and Ashok Suri, *Journal of Semiconductor Progress*, 1st Qtr., 1982, Published by: Fairchild Semiconductor.

*Primary Examiner*—Thomas M. Heckler
*Assistant Examiner*—John G. Mills
*Attorney, Agent, or Firm*—William A. Birdwell; George T. Noe

[57] ABSTRACT

An address computation system for updating starting addresses of data arrays in an array processor within an instruction cycle. A first set of registers is provided for storing starting addresses for each array. A second set of registers is provided for storing current addresses for each array. Logic is provided for initially providing, at the beginning of a series of computation steps to be executed repetitively, an address from a register in the first set of registers, changing that address, and storing it back in the same register and in a corresponding register in the second set, thereby updating the starting address for the next repetition of those computational steps while advancing the current address to the second of those steps.

8 Claims, 3 Drawing Figures

ADDRESS COMPUTATION SYSTEM FOR UPDATING STARTING ADDRESSES OF DATA ARRAYS IN AN ARRAY PROCESSOR WITHIN AN INSTRUCTION CYCLE

BACKGROUND OF THE INVENTION

This invention relates to digital processing apparatus, in particular to a system for computing the address of the next operand to be fetched from a data memory simultaneously with operation on the last operand fetched.

In array processing apparatus it is frequently necessary to operate on one ordered set, or array, of data by another ordered set of data repetitively, starting with a new data point in the first set on each successive operation. For example, in digital filtering of a signal represented by an array of samples of a signal waveform convolution is typically performed. A general expression representing the convolution of the signal x by the filter characteristic h is as follows:

P = number of coefficients of the filter characteristic $$y(i) = \sum_{n=0}^{P} h(i) \cdot x(i + n)$$

i = the number of a data point; $0 \leq i \leq P$

In this example each set of data points representing the waveform x is first multiplied by a corresponding coefficient of h and the sum of those products is added; thereafter, the coefficients are shifted by one position and this process is repeated. This multiplication and addition for each of the coefficients representing the filter characteristic is repeated until the entire data set representing the signal waveform has been convolved with all of the coefficients representing the filter characteristic. During each pass through the set of coefficients the addresses of the data and coefficients in the data memory must be computed after each successive multiplication and addition operation. After each such pass through the set of coefficients representing the filter characteristic, the system must return to a starting address pointing to the beginning of the set of coefficients in data memory and to a starting address pointing to the next data point in the set of data points representing the waveform, the original pointer having been updated by one.

One object ordinarily sought in array processing, particularly in signal processing, is to perform computation at high speed. This is especially important where real time processing is desirable. Where, as in the foregoing example, repetitive passes through sets of data points are necessary new addresses must be computed with each successive operation; that is, some mechanism must be provided for advancing the operand addresses during each pass and reinitializing the pointers at the beginning of every pass, including advancing the value to which a pointer is initialized.

In prior art microprocessor apparatus starting address computation typically requires that the starting addresses and the amount by which starting addresses are to be advanced be stored in a memory, that those values be fetched each time computation of a new starting address is needed, that is, for reinitializing the current address at the beginning of each new pass through a set of operands, and that the new starting address be computed. This process is accomplished by a series of program steps, that is, instructions. Apparatus which operate in this manner are represented, for example, by the TMS 320 microprocessor manufactured by Texas Instruments Corporation, and the F9445 microprocessor manufactured by Fairchild, Inc., and the ATMAC microprocessor manufactured by Radio Corporation of America. These program steps require overhead activity that increases the amount of time to accomplish an array processing operation.

Accordingly, it would be desirable to provide a mechanism that would keep track of starting and current addresses, compute new addresses as the array processing operation passes through the sets of data, and compute new starting addresses with each successive pass through a computation sequence simultaneously with the operation on the addressed operands so as to maximize the speed of array processing operations.

SUMMARY OF THE INVENTION

The need to eliminate overhead time conventionally used to compute new addresses and reinitialize pointers is accomplished in the present invention by the provision of system architecture that replaces a traditionally software function. A first set of address registers is provided for storing the pointers to the starting addresses of sets of data. A second set of address registers is provided for storing the current addresses associated with those data, and a third set of registers is provided for storing the page and memory on which those addresses occur. The address provided to the data memory is a concatenation of the output of the page registers and the output of either of the first or second address registers.

Initially the first set of registers, along with the page register, supplies the starting addresses to data memory. At the same time, the starting addresses in the first set of registers are changed by a predetermined amount and stored back in the second as well as the first set of registers, as needed. This not only updates the first set of registers to the starting addresses for the next loop, but advances the addresses in the second set of registers to the second step of the loop. Thereafter, as the system steps through a computation, the second register is changed with each successive step. Upon completion of one pass through a computational loop, the first set of registers again provides the starting addresses, which are also updated again, and the second set of registers proceeds as before. This occurs until the entire processing is complete.

Updating is accomplished by combinational logic which accepts the output from any of the first, second, or third sets of registers and combines it in an arithmetic logic unit according to a predetermined function with a predetermined value. The result is then stored back in the respective register. A selected value may be provided for changing the outputs and producing the aforementioned result. Addressing data memory, computation of the new addresses, and loading the new addresses into the address registers occurs within an instruction operational cycle of the data processing apparatus.

Therefore it is a principal object of the present invention to provide a novel address computation system for use in a data processing apparatus.

It is another object of the present invention to provide an address computational system wherein the starting address of a computational loop may be reinitialized automatically.

It is a further object of the present invention to provide an address computation system wherein data may be fetched and starting addresses updated simultaneously with a computational operation on the previous data operand.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
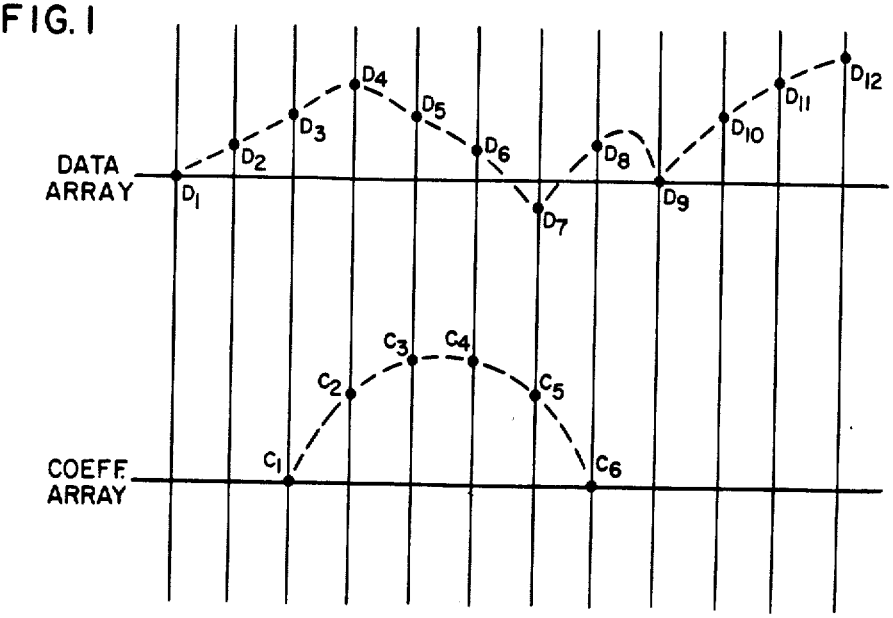
FIG. 1 shows exemplary sets of data points and coefficients to be employed in an array processing computation.
Figure 2:
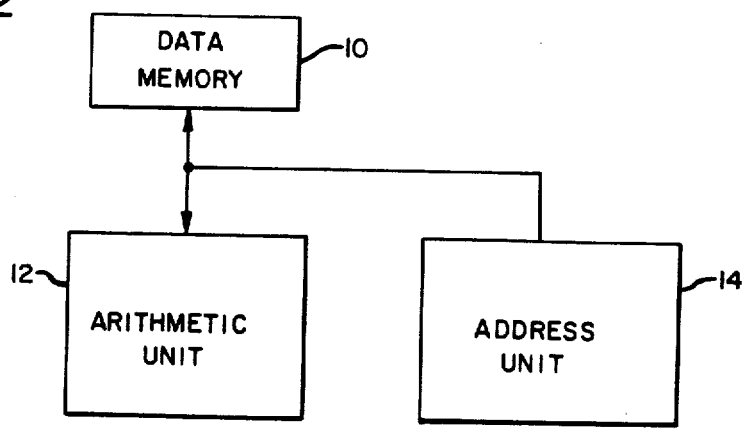
FIG. 2 shows a general example of a portion of array processor architecture with which the address computation system of the present invention could be advantageously used.

Referring to FIGS. 1 and 2, the data points D1–D12 represent a sampled signal waveform to be operated upon by the function represented by the coefficients C1–C6. These sets of data points and coefficients represent arrays to be processed and correspond to values stored in a data memory 10 of the generalized system shown in FIG. 2, each value having a respective memory address. In a typical application the data array would be convolved with the coefficient array. Accordingly, D1 and C1 are fetched from memory based upon addresses provided by the address unit 14 and would be multiplied in the arithmetic unit 12 which would save the result. D2 and C2 are then fetched and multiplied, and so on until D6 and C6 are fetched and multiplied, during the course of which the respective products are totalled. The final total would typically, though not necessarily, be saved in memory. Thereafter, the same sequence is repeated starting with the second data point in the data array; that is, D2 is multiplied by C1, D3 by C2, and so on until D7 is multiplied by C6. The process would be repeated again as many times as necessary to multiply a predetermined number of data points by all of the coefficients.

The process of multiplying the data points by respective coefficients and totalling the products comprises a series of steps to be performed repetitively, that is, a loop. During each pass through the loop the address unit must provide to the data memory the addresses of the current data and coefficient values to be multiplied. Hence, these addresses must be changed with each successive fetch, multiply, and add operation. At the beginning of each successive pass through the loop the address unit must point to the starting coefficient and the new starting data point addresses. While this array processing example is provided as a vehicle for explaining the present invention, it is to be recognized that many other array processing algorithms require repetitive stepping through one or more series of addresses corresponding to arrays of data starting with one or more new addresses with each successive series of operations, and that the present invention is applicable to many such algorithms.

In the generalized system as shown in FIG. 2 the computation of addresses occurs in the address unit 14 in the time that it takes the arithmetic unit 12 to complete an arithmetic operation, that is, within one operational instruction cycle of the data processing apparatus. In the aforementioned example, while one data point and one coefficient are being multiplied the address for the next data point is sent to memory and the address for the following data point is computed by the address unit. While the product is added to the previous product, the address for the next coefficient is sent to memory and the address for the following coefficient is computed. This assumes that the data memory automatically outputs its contents to the arithmetic unit upon receipt of an address and that the arithmetic unit contains registers for temporarily storing its operands, as is commonly known in the art. It is to be recognized that the address computation system of the present invention may be used with a variety of different processor architectures; it is preferred, however, that separate data and program instruction memories be provided and that the program instruction circuitry, the arithmetic unit, and address unit all operate simultaneously and independently for maximum utilization of the benefits of the present invention.

Figure 3:
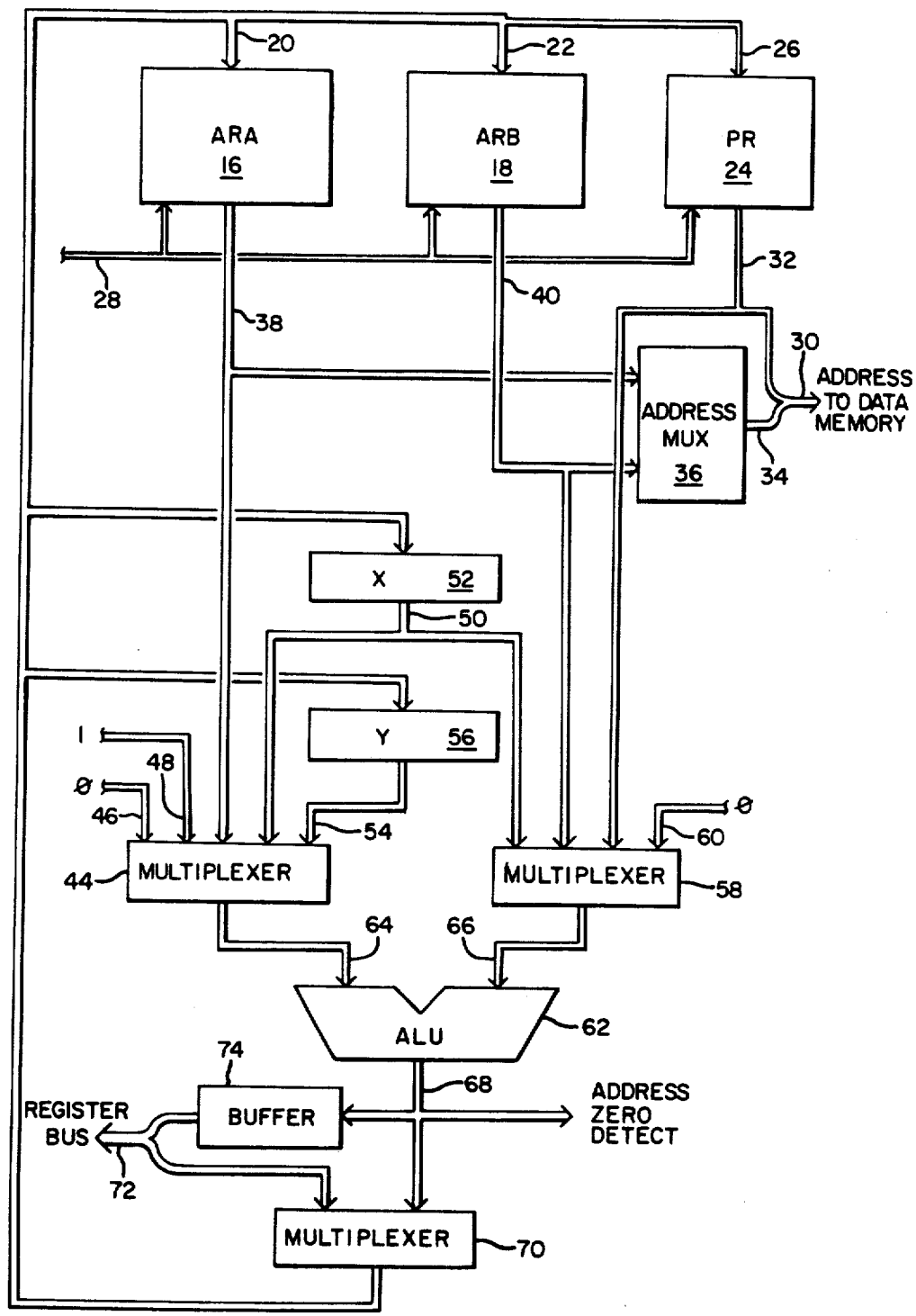
FIG. 3 shows a block diagram of a preferred embodiment of the address computation system of the present invention.

Turning to FIG. 3, which illustrates a preferred embodiment of the address computation system of the present invention, the starting address of each set of data to be accessed is stored in a first address memory ("ARA") 16, which is preferably actually a set of storage registers for storing the starting addresses of respective sets of data arrays. The current data addresses are stored in a second address memory ("ARB") 18, which preferably is also a set of storage registers for storing current addresses. The addresses in ARA 16 and ARB 18 are supplied by input ports 20 and 22, respectively, from a source of new or updated addresses.

Where data is stored in a memory in "pages" the system is preferably also provided with a page address memory ("PR") 24 for holding the most significant bits of the address to be sent to the data memory, the ARA and ARB holding the least significant bits of their respective addresses. Like the ARA and the ARB, PR 24 actually preferably comprises a plurality of registers for storing portions of addresses representing pages in which respective array data are stored. Like the ARA and ARB, the PR receives its address bits from a source of new or updated addresses at input port 26. The particular register in the ARA, ARB, and PR from or to which an address is being transferred during any particular operation is supplied by a register index input 28, which is a portion of the processor instruction code supplied by program instruction circuitry of any suitable design (not shown).

The address supplied to data memory at output 30 is a concatenation of the output 32 from the PR 24 and the output 34 from an address multiplexer 36. Initially the multiplexer 36 selects as its output the output 38 from the ARA 16. Thereafter, the address multiplexer 36 selects the output 40 from the ARB 18, that is, until one series of steps, or loop, is complete.

At the same time that the output from the ARA is supplied to multiplexer 36, it may be changed, that is, updated, and placed back into the corresponding register of the ARA via input port 20. Similarly, when the output from the ARB is supplied to address multiplexer 36, it may also be updated, with the result placed back in the corresponding register of the ARB via input port 22. It is of particular importance that when the output from the ARA is provided to the data memory and updated, the updated address is loaded not only into the ARA but the ARB as well, thereby advancing the ARB. Typically, the addresses are simply incremented by one; however, they may be incremented by some greater value, or decremented by some value, or they may not be changed at all. In any case, the mechanism for changing those values is described below.

The output 38 of the ARA 16 is supplied to a first intermediate multiplexer 44, which also receives as inputs a set of zeros from input 46, a set of ones from input 48, the output 50 (typically an offset value) from an x register 52, and the output 54 from a y register 56. Another intermediate multiplexer 58 receives as inputs the output 40 from the ARB 18, the output 32 from the PR 24, a set of zeros from input 60, and the output 50 from x register 52. An arithmetic logic unit ("ALU") 62, capable of selectively performing mathematical or logical operations, is provided with two inputs, that is, the output 64 from the first intermediate multiplexer 44 and the output 66 from the second intermediate multiplexer 58. These two inputs to the ALU 62 are combined by the ALU to provide a resultant output 68.

The output 68 from the ALU 62 is input to another multiplexer 70, whose output provides inputs to the ARA 16, the ARB 18, the PR 24, x register 52, and y register 56. Thus, the output from the multiplexer 70 may be used to update the addresses in the ARA, ARB, and PR, and to change the values in the x and y registers. For example, the output from the ARA 16 may be selected by multiplexer 44 for input to the ALU 62 along with the value of one of the inputs selected by multiplexer 58, so that the two values may be operated upon by the ALU logically or mathematically to produce a new value at output 68. A starting address in the ARA may be incremented by one by placing a one in the x register 52 and selecting that as an input from multiplexer 58 for addition to the value in a selected register of the ARA. The output from ALU 62 would represent the value in the selected register of the ARA plus one. The value of ARA plus one is selected by multiplexer 70 and sent to the input port 20 of the ARA which causes it to be stored back in the selected register of the ARA, thereby incrementing that register of the ARA by one. It is also sent to the input port 22 of the ARB for replacement of the corresponding current address therein, thereby advancing the current address corresponding to the set of data for which the starting address was updated. In the convolution example given above, this amounts to shifting the starting address of the data array by one data point, and advancing the current address of the data array to the second step of a new loop.

Similarly, each time an address is sent to the data memory from a selected register of the ARB 18 it may also be sent to the ALU 62 via intermediate multiplexer 58. Simultaneously, a number may be selected by intermediate multiplexer 44, for example from the x register, for addition to, and advancement of, the address, the result being stored back in the selected register of the ARB. In the convolution example this amounts to stepping to a new data point or coefficient.

The x register 52 thus serves to provide an amount by which the values in the ARA 16, ARB 18, or PR 24 can be changed. The y register 56 may be used, alternatively, to provide a value for changing the values in the ARB 18 or the PR 24. These x and y registers are loaded from a register bus 72 through the multiplexer 70, the values to be loaded in the x and y registers coming from other computational units, such as the aforementioned instruction circuitry, in complete data processing apparatus. For example, the x register could be loaded with a value by which a register in the ARA is to be incremented for reinitialization of the starting address of an array at the beginning of a loop, while the y register would be loaded with another value by which a register in the ARB would be incremented in computing the current address of another array during one pass through a loop.

The output 68 from the ALU may also be placed on the register bus 72 via a buffer 74 for use by other computational units in the apparatus. Under some circumstances it may be desirable to determine when a recomputed address is zero, which can be detected directly from the ALU output 68. It is to be recognized that the aforementioned functional features of the address computation unit include related control logic (not shown). The design and construction of specific circuitry for implementing the aforedescribed system architecture, including the associated control logic is well known in the art, and no particular design is necessary for the present invention, except that combinational logic is to be used so that output of an address and recomputation of that address for presentation to the inputs of the ARA, ARB, and PR all occur in one step, and storage of the result in the ARA, ARB, or PR occurs in a second step. As a result, presentation of addresses to data memory and updating of those addresses can be accomplished in a single operational instruction cycle of the data processing apparatus; that is, the period required for the arithmetic unit to execute fully a single operational instruction. Ordinarily, this would entail taking an operand from a storage location, such as a temporary storage register within the arithmetic unit, operating on that operand, and saving the result.

The terms and expressions which have been employed in the foregoing specification are used therein as terms of description and not of limitation, and there is no intention of the use of such terms and expressions of exluding equivalents of the features shown and described or portions thereof, it being recognized that the scope of the invention is defined and limited only by the claims which follow.

I claim:

1. An address computation system for updating starting addresses of data arrays in an array processor having a data memory and means for executing an operational instruction during an instruction cycle, comprising:
    (a) first address register means for storing a predetermined portion of a starting data address to be provided to said data memory;
    (b) second address register means for storing a predetermined portion of a current data address to be provided to said data memory;
    (c) output multiplexer means, responsive to the outputs of said first and second address register means and to an operational instruction, for selectively presenting to the data memory either said starting data address portion or said current data address portion; and
    (d) update combinational logic means, responsive to the output of said first address register means and to an operational instruction, for changing said starting data address portion by a predetermined amount to provide a changed data address portion as it is being presented to the data memory and loading said changed data address portion into both said first and second address means for storage therein, said changing and loading occurring within one instruction cycle of said data processing apparatus, whereby new current addresses and new starting addresses are computed with each successive pass through a computation sequence so as to maximize array processing speed.

2. The system of claim 1 wherein said predetermined portions of said starting and current data addresses comprise a predetermined number of least significant bits of multiple-bit binary addresses, said system further comprising third address register means for storing the remaining bits of said binary addresses and means responsive to the outputs of said third register means and said output multiplexer means for presenting a complete binary address to the data memory.

3. The system of claim 1 wherein said update logic unit includes means for changing said current data address portion by a predetermined amount to provide a second changed data address portion.

4. The system of claim 1 wherein said update logic unit includes arithmetic logic means for selectively performing arithmetic or logic operations on either or both of two input operands and producing a result, first intermediate multiplexer means for providing as one openand input to said arithmetic logic means said first data address portion from said first address register means, means for providing as a second operand input to said arithmetic logic means a predetermined value, and means for storing said result into one or both of said address register means.

5. The system of claim 4 wherein said means for providing a predetermined value comprises an offset register means for storing said predetermined value and a second intermediate multiplexer means for selecting as an input operand to said arithmetic logic means the value stored in said offset register means.

6. The system of claim 5 wherein said second intermediate multiplexer means is responsive to said second address register means for selecting as an input to said arithmetic logic means said current data address portion stored in said second address register means, and said first intermediate multiplexer means is responsive to said offset register means for selecting as an input to said arithmetic logic means the value stored in said offset register means.

7. The system of claim 1 wherein said first and second address register means each comprise a plurality of storage registers and means for selectively storing in or reading from those storage registers an address portion.

8. The system of claim 7 wherein the portions of data addresses stored in said first and second address register means comprise a predetermined number of the least significant bits of respective binary addresses, said system further comprising a third plurality of storage registers for storing the remaining bits of said binary addresses, means for selectively storing in or reading from the third storage registers, and means responsive to the third storage registers and said output multiplexer means for presenting a complete binary address to the data memory.

* * * * *

UNITED STATES PATENT AND TRADEMARK OFFICE

CERTIFICATE EXTENDING PATENT TERM
UNDER 35 U.S.C. § 156

PATENT NO.     : 4,804,680

DATED          : February 14, 1989

INVENTOR(S)    : Alexander C. Goudie et al.

PATENT OWNER   : Pfizer Inc.

This is to certify that there has been presented to the

COMMISSIONER OF PATENTS AND TRADEMARKS an application under 35 U.S.C. § 156 for an extension of the patent term. Since it appears that the requirements of the law have been met, this certificate extends the term of the patent for the period of

237 DAYS from the date of expiration of the original patent term, July 21, 2007, with all rights pertaining thereto as provided by 35 U.S.C. § 156(b).

I have caused the seal of the Patent and Trademark Office to be affixed this 23rd day of September 1996.

Bruce A. Lehman
Assistant Secretary of Commerce and
  Commissioner of Patents and Trademarks